(12) United States Patent
Ramsay (10) Patent No.: US 11,277,474 B2
(45) Date of Patent: Mar. 15, 2022

(54) SYSTEM FOR ENABLING CLOUD ACCESS TO LEGACY APPLICATION

(71) Applicant: Sage (UK) Ltd, Newcastle upon Tyne (GB)

(72) Inventor: Mark Ramsay, Newcastle upon Tyne (GB)

(*) Notice: Subject to any disclaimer, the term of this patent is extended or adjusted under 35 U.S.C. 154(b) by 0 days.

(21) Appl. No.: 16/331,085

(22) PCT Filed: Sep. 5, 2017

(86) PCT No.: PCT/GB2017/052581
§ 371 (c)(1),
(2) Date: Mar. 6, 2019

(87) PCT Pub. No.: WO2018/046904
PCT Pub. Date: Mar. 15, 2018

(65) Prior Publication Data
US 2019/0208017 A1  Jul. 4, 2019

(30) Foreign Application Priority Data
Sep. 7, 2016 (GB) ..................... 1615194

(51) Int. Cl.
*H04L 29/08* (2006.01)
*H04L 67/1097* (2022.01)
(Continued)

(52) U.S. Cl.
CPC ...... *H04L 67/1097* (2013.01); *H04L 67/1095* (2013.01); *H04L 67/2823* (2013.01)

(58) Field of Classification Search
CPC ......... H04L 67/02; H04L 67/10; H04L 67/42; H04L 67/1095; H04L 67/1097;
(Continued)

(56) References Cited

U.S. PATENT DOCUMENTS 8,650,202 B2 *  2/2014  Duff ..................... H04L 67/141
707/756
8,756,597 B2 *  6/2014  Srinivasan ......... G06F 9/45533
718/1
(Continued)

FOREIGN PATENT DOCUMENTS

WO   WO 2005/116892 A1   12/2005
WO   WO 2017/011609 A1   1/2017

OTHER PUBLICATIONS

Search Report received in Great Britain Patent Application No. 1615194.6, dated Mar. 2, 2017; 3 pages.

*Primary Examiner* — James N Fiorillo
(74) *Attorney, Agent, or Firm* — Burns & Levinson, LLP; Stevens Mills; Daniel McGrath (57) ABSTRACT

A system enabling cloud access to a legacy application, said system comprising a local system and a cloud system, wherein the local system comprises: a locally stored legacy application; a first storage comprising a first data store associated with the application; an adapter configured to retrieve data from the first data store; and a synchronization engine configured to synchronize the retrieved data with the cloud system; and the cloud system comprises: a second storage comprising a second data store associated with the legacy application; and an application programming interface, API, configured to receive the retrieved data from the local system and update the second data store based on the received data.

18 Claims, 8 Drawing Sheets

(51) Int. Cl.
*H04L 67/1095* (2022.01)
*H04L 67/565* (2022.01)

(58) Field of Classification Search
CPC . H04L 67/2823; H04L 67/2842; H04L 51/06; H04L 65/601; H04L 69/08; H04L 29/08; G06F 9/54; G06F 9/445; G06F 9/461; G06F 9/509; G06F 9/45558; G06F 9/46; G06F 9/45537; G06F 16/10; G06F 16/27; G06F 16/178; G06F 16/9577; G06F 3/0601; G06F 11/2056
USPC .......................................................... 709/219
See application file for complete search history.

(56) References Cited

U.S. PATENT DOCUMENTS

| | | | |
|---|---|---|---|
| 2002/0059425 A1* | 5/2002 | Belfiore | G06F 9/54 709/226 |
| 2006/0230124 A1* | 10/2006 | Belfiore | G06F 9/451 709/219 |
| 2011/0093567 A1 | 4/2011 | Jeon et al. | |
| 2012/0278283 A1 | 11/2012 | Hildebrand et al. | |
| 2012/0290478 A1* | 11/2012 | Crofts | G06Q 40/00 705/44 |
| 2013/0282790 A1 | 1/2013 | Catmull et al. | |
| 2013/0151598 A1* | 6/2013 | Fu | G06F 9/452 709/203 |
| 2013/0173918 A1 | 7/2013 | Saraswat et al. | |
| 2013/0326513 A1* | 12/2013 | Shlomai | G06F 9/45537 718/1 |
| 2014/0109095 A1* | 4/2014 | Farkash | H04L 67/10 718/102 |
| 2014/0304326 A1* | 10/2014 | Wesley | H04L 67/10 709/203 |
| 2015/0142858 A1* | 5/2015 | Bryan | G06F 16/258 707/809 |
| 2015/0227571 A1 | 8/2015 | Stefani et al. | |
| 2016/0092339 A1* | 3/2016 | Straub | H04L 67/10 717/124 |
| 2016/0261684 A1* | 9/2016 | Khalaf | G06F 9/45558 |
| 2017/0048079 A1* | 2/2017 | Nethi | H04L 12/2836 |
| 2017/0048339 A1* | 2/2017 | Straub | G06F 8/40 |
| 2017/0075921 A1* | 3/2017 | Benton | H04L 67/1095 |
| 2017/0116206 A1* | 4/2017 | Gumerato | G06F 16/273 |
| 2017/0351536 A1* | 12/2017 | Kamalakantha | G06F 9/54 |
| 2018/0024964 A1* | 1/2018 | Mao | G06F 1/3268 711/173 |
| 2018/0041598 A1* | 2/2018 | Vats | H04L 63/0281 |
| 2018/0067881 A1* | 3/2018 | Frandzel | G06F 13/18 |

* cited by examiner

```
"supplier{
   "type":"object",
   "description" : "Information relating to business/individuals from whom the
associated company purchase goods/service",
   "allOf":[
       "$ref" : "#/defintions/codeBase"
       "type" : "object"
       "properties" : {
           "status" " {
               "$reg" " "#/definitions/supplierStatus"
           }
           "financial" : {
               "$ref" : "#/definitions/financial"
           }
           "social" : {
               "$ref" : "#/definitions/social"
           }
```

*Fig. 3A*

```
"transaction" {
"type": "Object",
"description"; "Details of items bought/sold by the company.",
{
        "type": "object",
        "required": ["accountId", "reference", "date", "currency", "type", "dueDate",
"netAmount", "taxAmounts", "originatorType", "originatorId"],
        "properties": {
          "accountId": {
            "type": "string",
            "description": "The corresponding chart of accounts account record id the
transaction is related to."
          },
          "reference": {
            "type": "string",
            "description": "The transaction code."
          },
          "date": {
            "type": "string".
            "format": "date",
            "description": "Date of the transaction in ISO 8601 full-date format."
          },
          "currency": {
            "type": "string",
            "description": "Currency of the transaction. For currency codes, use ISO
4217."
          },
          "type": {
            "type": "string",
            "description": "Type of transactions being represented i.e. artefact such as
sales invoice, sales credit, purchase invoice etc or, transaction such as bank payment, cash
receipt etc.",
            "enum": [ "JournalCredit", "JournalDebit", "SalesInvoice", "SalesCredit",
"SalesReceipt", "SalesPayment", "PurchaseInvoice", "PurchaseCredit",
"PurchasePaymentOnAccount", "PurchasePayment", "PurchaseReceipt", "BankPayment",
"CashPayment", "CreditCardPayment", "]
          },
          "dueDate": [
            "type": "string",
            "format": "date",
            "description": "The date, in ISO 8601 full-date format, the artefact is due to
be paid."
          },
          "netAmount": {
            "type": "number",
            "format": "float",
            "description": "Numeric value representing the net amount of the
transaction."
          },
          "taxAmounts": {
            "type": "array",
            "description": "The id and amount of the tax associated to a specific transaction.",
          }
          "description": "Type of artefact transaction has originated from i.e. sales
invoice."
          },
```

SYSTEM FOR ENABLING CLOUD ACCESS TO LEGACY APPLICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field

The present application relates to a system and method for enabling cloud access to a legacy application.

Background

Increasingly, there is a desire for applications of various types to be accessible via the cloud. The use of the cloud as a means of hosting an application has clear advantages over locally-held applications (referred to as "desktop applications" in the art) in terms of the accessibility, because it allows 24/7 access from any location, be that from the premises of the application owner ("on-premise") or remote from the premises of the application owner ("off-premise"). Furthermore, cloud-hosted applications typically provide APIs that allow remote access to the applications in a controlled, prescribed manner via HTTP or HTTPS, providing a broadly compatible and secure means of access. Such APIs can also enable the cloud-hosted application to be accessed via mobile applications or web-based applications, further improving the accessibility thereof.

However, in various fields older ("legacy") desktop applications are still routinely relied on for key functionality. For example, in the financial, payroll and accountancy field, applications are used that are Microsoft Windows®-based and were developed many years ago, before the concept of cloud collaboration existed. As a result, these applications were not developed with off-premise collaboration in mind. These legacy applications are often designed around particular local technologies or architectures and require specific versions of operating systems or libraries, and particular database structures. In some cases, the data and logic of the application may also be proprietary and/or opaque to the user or administrator. All of these factors mean it is inherently difficult to make such applications cloud-accessible, without undertaking significant development to adapt, refactor and in some cases effectively rewrite, the software so that it can work in the cloud environment. Or, such approaches may be inefficient in terms of utilization of computing and network resources.

While it is possible to provide remote access to legacy desktop applications via a virtual private network (VPN) tunnel or similar remote connection technology to the system hosting the application, such an approach does not have the advantages of cloud-hosted applications that allow mobile and web-based access. Furthermore, such an approach typically requires the user accessing the remote application to undertake significant configuration before access, both in terms of installing and configuring a client application and also in terms of providing sufficient network infrastructure and capacity to accommodate these connections. In a commercial situation, this leads to a complex solution, and places responsibility on a user to provide and manage appropriate infrastructure to enable that complex solution.

One or more aspects of the present application address at least some of the above-mentioned difficulties, or other difficulties that will be appreciated by the skilled person from the description below. Accordingly, aspects of the present application may be considered to provide convenient, cost effective, secure, and resource efficient means of accessing the data and logic of legacy desktop applications via the cloud.

SUMMARY

Aspects of the present application correspond to an apparatus and method as set forth in the appended claims. Other features of the invention will be apparent from the dependent claims, and the description which follows.

According to a first aspect of the present application there is provided a system enabling cloud access to a legacy application, said system comprising a local system and a cloud system. The system can include a locally stored legacy application and a first storage comprising a first data store associated with the application. The system can further include an adapter configured to retrieve data from the first data store and a synchronization engine configured to synchronize the retrieved data with the cloud system. The cloud system can include a second storage comprising a second data store associated with the legacy application and an application programming interface, API, configured to receive the retrieved data from the local system and update the second data store based on the received data. The API may provide a programmatic interface that may be accessed by the local system.

The second data store may encompass a number of embodiments, including, but not limited to a relational database, a flat file, preferably a list of comma-separated values, a spread sheet, preferably a Microsoft® Excel workbook or Google® Sheets spread sheet, and the like. Each workbook or spread sheet may represent a particular data set, with the worksheets of the workbook representing particular tables of the data set.

The cloud system may be embodied or executed in one or more server computers. The server computers may be housed in a single physical location, such as a data center. The server computers may be distributed over a plurality of physical locations. The cloud system may comprise a plurality of second data stores and may be configured to synchronize data with a plurality of local systems.

The API may be a representational state transfer, REST, API, preferably the Microsoft® Graph API.

The system, preferably the cloud system, may further comprise one or more consumer systems that are configured to access the second data store. The cloud system may comprise consumer APIs that enable access to the second data store by consumer systems. The consumer systems may comprise at least one of a mobile application, desktop application or web application, configured to remotely view, create, edit or delete the data.

The application may be a software application that is configured to be executed on the local system and configured to operate with the first data store. The application may be payroll, accountancy, or financial reporting software. The local system may comprise an operating system and/or libraries configured to support the local application.

The adapter may be a software application that is configured to operate as an intermediary between the local application and the cloud system. The adapter may be configured to directly extract data from the first data store. The first data store may comprise a database and the adapter may be configured to directly extract data by querying the database.

The adapter may be configured to receive a command from the cloud system and then execute the command against the application. The adapter may be configured to execute the command by directly accessing the first data store. The adapter may be configured to execute the command by executing a stored procedure. The adapter may be configured to execute the command by accessing a local API provided by the application. The adapter may be configured to execute the command by executing shared business logic. The command may be a request to create, edit or delete data stored in the first data store. The second storage may also comprise a command list comprising commands to be executed by respective local applications. The cloud system may be configured to generate commands and place them in the command list in response to actions performed by the cloud system or consumer systems. The adapter may be configured to send a response to the command to the cloud system. The response may be an error message indicating that the command could not be executed. The adapter may generate only a response that is an error message, with the result of successfully executed commands being apparent from a subsequent synchronization. Alternatively, the response may comprise data requested in the command. The response may comprise an identifier identifying a new data item.

The adapter may correspond to one local application. The adapter may correspond to one version of the local application. The adapter may be configured to operate as an intermediary between a plurality of applications and the cloud system. The adapter may be configured to operate as an intermediary between a plurality of versions, preferably a predetermined number of preceding versions, of the local application and the cloud system.

The local system may be configured to only synchronize data that has been changed or created since a previous synchronization. The adapter may be configured to retrieve only data that has been changed or created since the previous synchronization. The synchronization engine may be configured to filter the retrieved data to remove data items that have not changed since the previous synchronization. The synchronization engine may perform a brute-force comparison of the retrieved data with data from the previous synchronization.

The data may comprise data formatted in JavaScript Object Notation, (JSON).

The local system may comprise a connectivity unit configured to manage the connection between the adapter and the cloud system. The connectivity unit may act as a second adapter, encapsulating the interactions of the local system with a platform used by the cloud system. The platform may be Microsoft® Graph, Microsoft Office® 365 or Google Cloud Platform. The connectivity unit may maintain relevant authentication or authorization information for accessing the platform. The connectivity unit may publish data or files, preferably a data contract, so that a data format of the data retrievable from the adapter is accessible to the cloud system. The connectivity unit may format the retrieved data so that it is in a format that is suitable for upload to the second data store. Each connectivity unit may be configured to receive and store commands from the cloud system, preferably by downloading the commands.

The synchronization engine may be operable to receive a request to initiate synchronization. The request for synchronization may comprise one or more the following parameters: a reference to an adapter; a reference to a particular dataset held by the first data store; a reference to a particular connectivity unit; one or more commands. Upon receipt of the request, the synchronization engine may load the specified adapters and receive retrieved data from the adapters. The synchronization engine may pass the retrieved data to the relevant connectivity unit for transmission to the cloud system.

The synchronization engine may be configured to trigger the passing of the commands stored in the connectivity unit to the data adapter. On execution of the commands, the synchronization engine may then notify the respective connectivity units of which commands were and were not successfully executed. The synchronization engine may also be configured to filter and/or format the results returned by data adapter.

The local system may comprise a scheduler configured to request that the synchronization engine performs the synchronization. The scheduler may request the synchronization at predetermined intervals, such as a predetermined number of minutes or hours. The scheduler may be configured to request the synchronization at fixed times of day. The scheduler may also be configured to trigger synchronization in response to an event occurring in the local application. The event may comprise creation or modification of data in the first data store, preferably by a local user.

The cloud system may comprise a job service unit. The job service unit is configured to execute one or more jobs in response to data being synchronized to the cloud system. A job may comprise updating data held in the second storage is not held in the second data store. The second storage may comprise a list of contacts, and the job may comprise updating the contacts to reflect changes in the data held in the second data store. The job service unit may also be configured to execute jobs in response to data in the second data store being modified by the cloud system or consumer systems. The job may comprise generating commands in order to update the first data store to reflect changes in the data in the second data store.

According to a second aspect of the present application a method of enabling cloud access to a legacy application in a system comprising a local system and a cloud system is provide. The local system can include a locally installed legacy application. The local system can also include a first storage comprising a first data store associated with the legacy application; an adapter configured to retrieve data from the first data store and a synchronization engine configured to synchronize the retrieved data with the cloud system. The cloud system can include a second storage comprising a second data store associated with the legacy application. The cloud system can further include an application programming interface, API, configured to receive the retrieved data from the local system and update the second data store based on the received data. The method implemented at the local system can include retrieving data by the adapter from the first data store and synchronizing by the synchronization engine the retrieved data with the cloud system, and at the cloud system. The method can further include receiving the retrieved data by the API, and updating the second store based on the received data.

The method may be carried out in response to a request from a scheduler or the cloud system. The method may further include formatting the received data before transmitting it to the cloud system. The method can further include removing any data items from the received data that are unchanged since the previous synchronization.

Further aspects of the components required in the method of the second aspect are defined hereinabove in relation to the first aspect and may be combined in any combination.

According to a third aspect of the invention there is provided a method of creating or modifying data associated with an application of a local system by a cloud system is provided. The method includes receiving a command from the cloud system and using an adapter to execute the command against the application to create or modify the data. The commands may be received from the cloud system by a connectivity unit of the local system. The commands may be passed from the connectivity unit to the adapter and executed in response to a synchronization request. The method may comprise providing a response to the connectivity unit. The response may be an error message indicating that the command could not be executed. The response may indicate that the command has been successfully executed. The response may be transmitted to the cloud system by the connectivity unit.

The method of the third aspect may be carried out as part of the method of the second aspect. The created or modified data may therefore be synchronized with the cloud system.

Further aspects the components required in the method of the third aspect are defined hereinabove in relation to the first and second aspects and may be combined in any combination.

According to a fourth aspect of the present application there is provided an adapter for use in a system according to the first aspect installable on a local system comprising a locally stored legacy application, the local system being connectable to a cloud system, wherein the adapter is configured to retrieve data from a first data store associated with the locally installed legacy application for synchronization with the cloud system.

According to an aspect of the present application there is provided a system for synchronizing data between a local system and a cloud system, the local system comprising: an application; a first storage comprising a first data store associated with the application; an adapter configured to retrieve data from the first data store; and a synchronization engine configured to synchronize the retrieved data with the cloud system; and the cloud system comprising: a second storage comprising a second data store associated with the application; and an application programming interface, API, configured to receive the retrieved data from the local system and update the second data store based on the received data.

According to an aspect of the present application there is provided a method of synchronizing data associated with an application of a local system with a cloud system, comprising: executing an adapter to retrieve stored data associated with the application; transmitting the received data to the cloud system.

According to an aspect of the present application, there is provided an adapter installable on a local system comprising an application, the local system being connectable to a cloud system, wherein the adapter is configured to retrieve data from a first data store associated with the application for synchronization with the cloud system.

One or more aspects or descriptions of the components required in the adapter of the fourth aspect are defined hereinabove in relation to the first, second and third aspects and may be combined in any combination.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIGS. 3A and 3B are example illustrations of the object definitions used by commands of an example system;

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DETAILED DESCRIPTION

Embodiments in accordance with the present application may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In overview, embodiments of the present invention provide an adapter installable on a system having a locally-installed legacy application, which enables cloud access to the legacy application. In some embodiments, means are provided for efficiently synchronizing data between a cloud system and the locally-installed legacy application.

Figure 1:
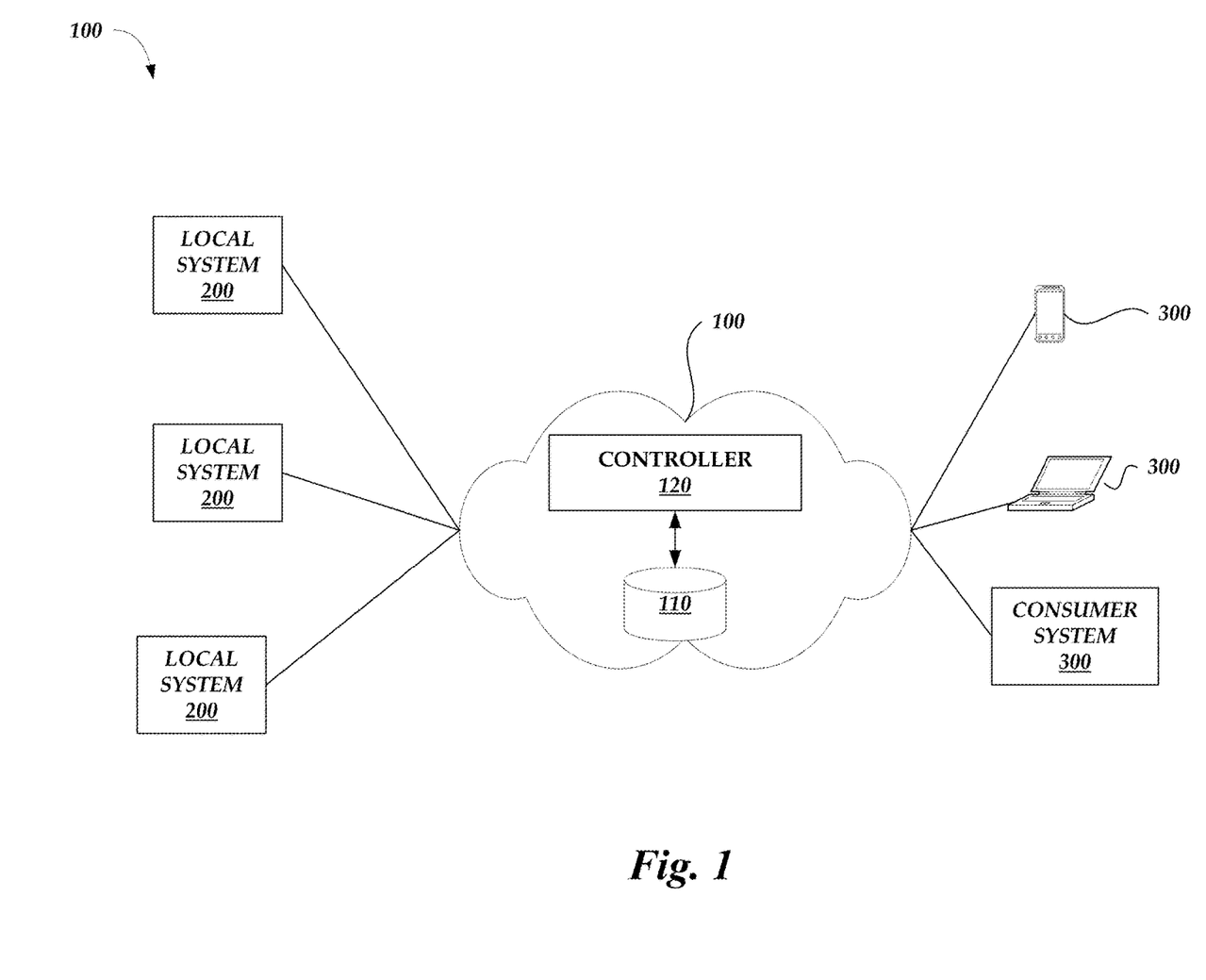
FIG. 1 is a schematic view of an example environment in which examples of the invention may operate.

FIG. 1 is a schematic overview of the architecture of a system in which examples of the invention may operate. In one example, the system 1 comprises a cloud system 100, one or more local systems 200 and one or more consumer systems 300. The cloud system 100 is connected to the local systems 200 and the consumer systems 300 by means of appropriate network connections. The network connections may take any suitable form, including secure wired and/or wireless communication links, and may encompass wide area networks such as private leased lines or the Internet.

The cloud system 100 comprises one or more server computers. The server computers may be housed in a single physical location, such as a data center, or may be distributed over numerous physical locations and connected via appropriate network connections. These network connections may also take any suitable form, including secure wired and/or wireless communication links and may encompass wide area networks such as private leased lines or the Internet.

The cloud system 100 generally comprises storage 110 and a controller 120. The storage 110 comprises suitable persistent storage means, including hard disk drives, solid state drives, RAID arrays and the like. The storage 110 may comprise a single storage device on a single server, but typically will comprise multiple storage devices distributed over several servers. The storage 110 stores, either permanently or temporarily, any data that is required for the operation of the cloud system 100. The storage 110 also stores applications and data to be consumed by the consumer systems 300. The storage 110 may comprise Microsoft® One Drive or Google® Drive. The controller 120 comprises suitable software and hardware for managing and controlling the cloud system 100, including one or more processors and cloud management software. The processors may be distributed over several servers.

The cloud system 100 makes the data stored therein and the applications installed thereon accessible to remote systems via Application Programming Interfaces (APIs). In one example, the cloud system 100 uses a REST (representational state transfer) API, such as the Microsoft® Graph API.

The cloud system 100 is connected to one or more local systems 200. In one example, the local systems 200 are systems under the control of an organization (e.g., a particular company), and comprising local applications installed thereon. For example, the local system 200 may be a system comprising one or more of the accountancy, payroll, supply chain management, CRM, human resources, business intelligence and financial reporting applications of a given company. The local system 200 may also comprise contact information, for example of entities related to the applications (e.g., customers, suppliers, employees, etc.), along with other data relevant to that organization, such as calendars and tasks.

In other examples, the local system 200 may be a system comprising other specialized software, such as applications for use in the bioinformatics, cheminformatics, text-mining, medical, healthcare or banking (including payments) fields, which are not normally cloud compatible. For example, locally-stored sensitive information (e.g., patient data) may be synchronized in an anonymous form to the cloud system 100 for analytic purposes (e.g., for use in disease registries or drug post-marketing surveillance registries. In further examples, locally stored lab data derived by specialized applications (e.g., genomic or proteomic data) may by synchronized to the cloud system 100 for analysis, or real-time individual physical activity data from various wearable devices may be synchronized to the cloud system 100 for analysis.

The local systems 200 may be server computers or desktop computers. The local systems 200 are configured to transmit and receive commands and data to and from the cloud system 100, as will be discussed in more detail below.

The consumer systems 300 are systems that consume the cloud resources, by accessing APIs provided by the cloud system 100. For example, the consumer systems 300 may comprise mobile applications or web applications that consume cloud data. The consumer systems 300 may also be cloud-hosted, and therefore form part of the cloud system 100. In the example where the local systems 200 comprise accountancy, payroll and financial reporting applications, the web applications or mobile applications may comprise means of remotely viewing, editing or analyzing the data held by the accountancy, payroll and financial reporting applications. In further examples, the consumer systems 300 may comprise local desktop applications used on or off premise, thereby providing a convenient means of accessing the data associated with the local application 240 that is suitable for local application integration.

Figure 2:
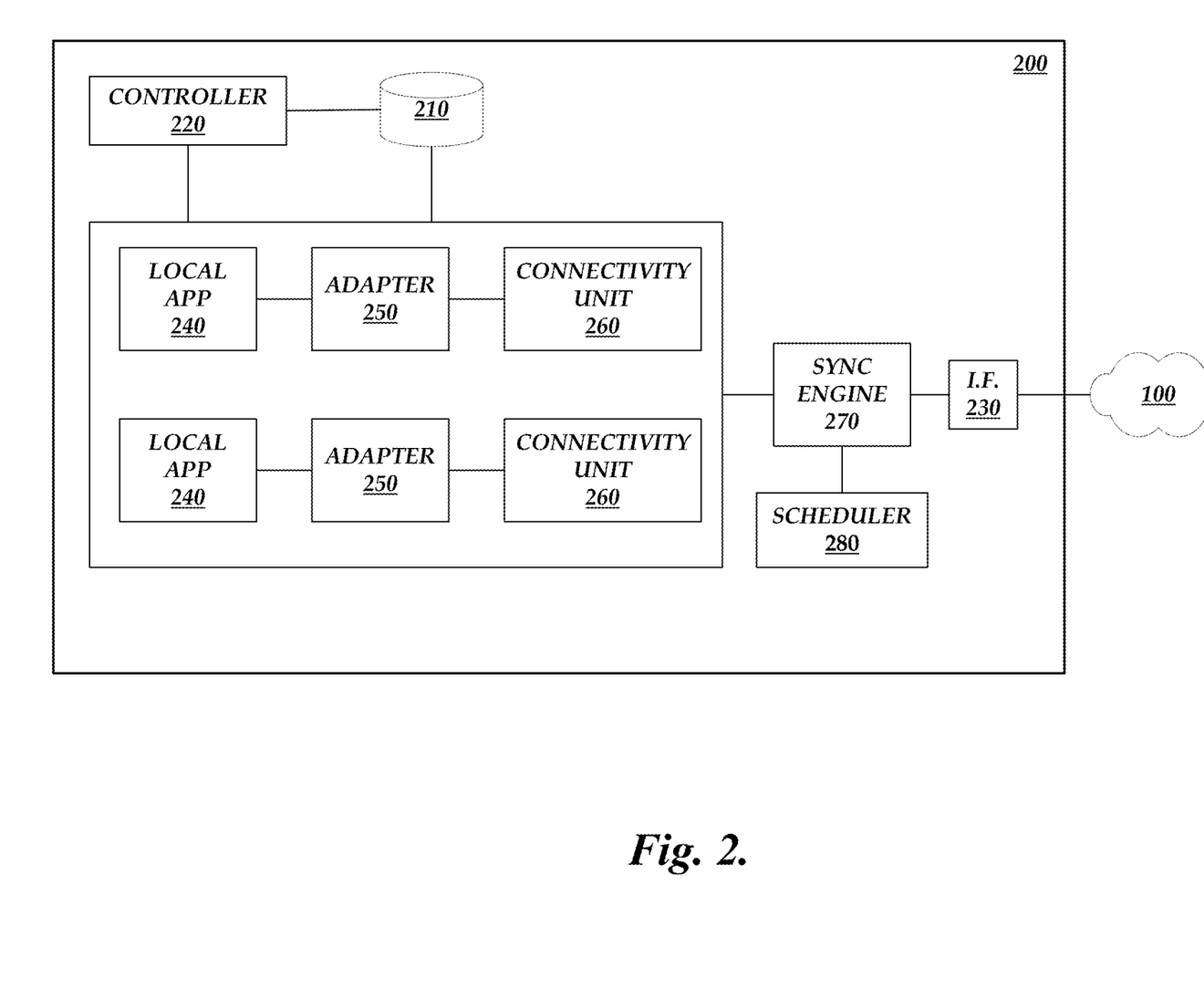
FIG. 2 is a schematic view of an example local system.

FIG. 2 shows an example of the local system 200 in more detail. In one example, the local system 200 comprises a controller 220, storage 210, a communication interface 230, at least one local application 240, an adapter 250, a connectivity unit 260, and a synchronization engine 270.

The controller 220 comprises suitable software and hardware for managing and controlling the local system 100, including one or more processors, an operating system and other control software.

The storage 210 stores data associated with the local application 240. For example, the storage 210 may comprise one or more databases or other data repositories associated therewith. In addition, the storage 210 may also store the local application 240. The storage 210 may also store, either permanently or temporarily, any other data required for the operation of the local system 200.

The communication interface 230 is a suitable network interface that manages communications to and from the cloud system 100, and may include one or more network cards, switches, routers and other such networking hardware.

The local application 240 is a software application that is configured to be executed on the local system 100. In one example, the local application 240 may be payroll, accountancy, or financial reporting software (for example, legacy software, designed to operate on a single machine or a local network) that is configured to operate with one or more databases or other data stores stored in the storage 210. In one example, the local system 200 is specially configured to allow the local application 240 to run, for example by ensuring that the local system 200 has particular versions of operating systems, libraries and other relevant software installed.

The adapter 250 is a software application that operates as an intermediary between the local application 240 and the cloud system 100 via the communication interface 230. The adapter 250 is configured to extract data from the local application 240 and its associated data stores and transmit that data to the cloud system 100. Accordingly, the local application data may be synchronized to the cloud system 100 and accessed therefrom. In one example, the adapter 250 comprises an API that is accessible by the cloud system 100.

In one example, the adapter 250 is also configured to receive a command from the cloud system 100 and then execute the command against the local application 240. The code required to execute or process the command against the local application 240 is encapsulated in the adapter 250. Accordingly, the cloud system 100 sending the command requires no knowledge of the underlying structure of the data held on the local system 200, the logic of the local application 240, the architecture and environment of the local system 200 and so on. Instead the adapter 250 is configured to receive the commands and transmit messages in a standard format—e.g., one defined by a pre-agreed data contract—using predefined commands that will be discussed in detail below. Thus, only the adapter 250 needs to be operable to communicate outside a local network on which the local application 240 is running. Therefore, it is not necessary for access to the local application 240 to be set up for the cloud system 100, other than by way of the adapter 250. This means that multiple elements of the cloud system 100 and the consumer systems 300 can all access the local application 240 without specific access being set up for that part of the cloud or consumer system 100, 300.

In one example, one adapter 250 is provided corresponding to each local application 240, and/or each version of the local application 240 that is installed on the local system 200. Typically, one adapter 250 will support the current version of the application 240, along with a predetermined number of preceding versions of the application 240. In further examples, one adapter 250 may operate as an intermediary between several local applications 240 and the cloud system 100.

Illustratively, the adapter 250 executes the command against the local application 240 according to the details of the local application 240 and the local system 200. Such execution can vary based on the specifics of the local application 240 and the local system 200.

In one example, the adapter 250 is configured to execute the command by directly accessing the data stored in the storage 210 that is associated with the local application 240. For example, if the command is a request to retrieve data (e.g., retrieve customer details from an accountancy application), the adapter 250 may be configured to access a data store (e.g., query a database or retrieve data from a flat file) associated with the local application 240 to retrieve the relevant details. The means of accessing the data store varies depending upon the technology used in the local application 240. For example, the adapter 250 may use APIs or other interfaces that employ one or more of the following technologies: ODBC, ADO.NET, SQL Server, MySQL, Business Objects and Data Objects.

However, in one example, the adapter 250 is configured to execute the command by executing stored procedures, routines or interfacing with the local application 240 by locally-available APIs. This may also involve executing shared business logic or accessing shared libraries in order to execute the command. For example, if the command is a request to create a new record (e.g., create a new customer in an accountancy application) or edit a record, the adapter 250 may execute a stored procedure against the data store associated with the local application 240. In further examples, the adapter 250 may programmatically access a locally-available API that then carries out the command under the control of the local application 240. Accordingly, the data stored in the local system 200 may be manipulated from the cloud system 100. Accessing the data stored in the storage 210 via stored procedures or routines, shared business logic, local APIs and/or shared libraries advantageously acts to ensure data integrity It will be understood that the adapter 250 may employ any combination of direct data access, stored procedure execution and API access to execute the received command. In one example, the received commands are executed by the adapter 240 upon receipt. In further examples, the received commands may be stored and then executed in batch.

Figure 3A:
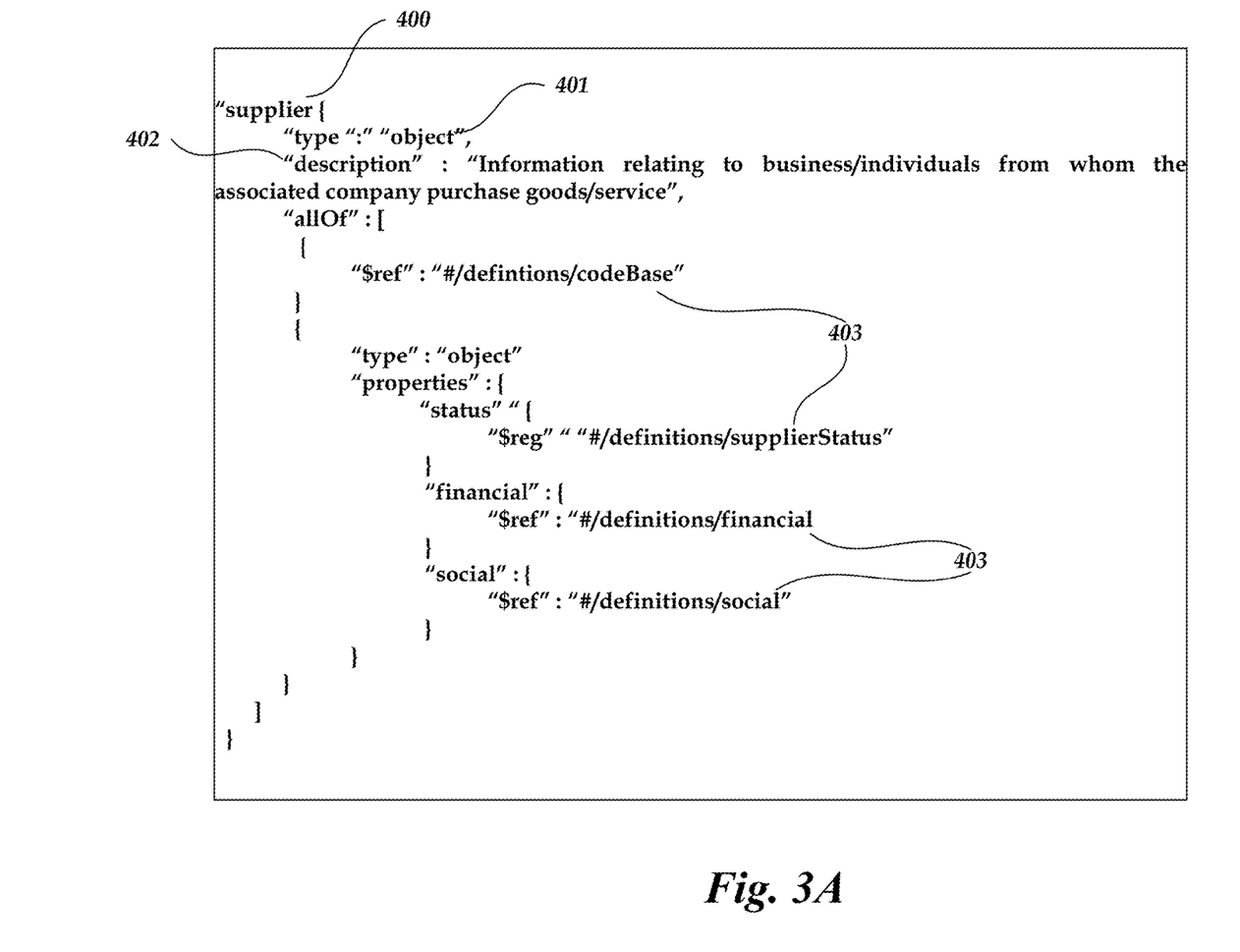

An example of the commands will now be described with reference to FIGS. 3A and 3B. FIGS. 3A and 3B each show an example definition of an object that may be included as a parameter or argument in a command. In this case of FIG. 3A, the object 400 is a supplier of goods or services. The definition includes a various attribute-value pairs, including a definition of the type of the object 401, a description 402 providing a brief textual summary of the purpose of the object, and references 403 incorporating the attribute-value pairs defined in other definitions. The use of references allows definitions of objects to be flexibly and consistently constructed by combining previous definitions. Accordingly, a succinct and expressive means of defining the data to be synchronized is provided.

FIG. 3B shows part of an example definition of an object 500 that represents a transaction. Similarly to the object 500 shown in FIG. 3A, the definition includes attribute-value pairs including a definition of the type of the object 501 and a description 502 providing a brief textual summary of the purpose of the object. The definition also includes lists 504 defining acceptable values for particular attributes.

Commands take the form of verbs having the object 400 as arguments. For example, a command "CreateCustomer" may take an object 400 in line with the definition shown in FIG. 3A as an argument, and execution of that command would result in the creation of a customer in the local application 240 having the specified attributes. Similarly, a command "PayInvoice" may include an object 500 defining the transaction that settles an invoice. It will be understood that a range of other relevant commands may be defined, depending on the nature of the local application 240.

Returning to FIG. 2, the adapter 250 may be further configured to send messages to the cloud system 100 via the communication interface 230.

In one example, the messages may be in response to a received command or a request for synchronization. For example, if the command is a request for a particular piece of data the adapter 250 is configured to transmit a response message comprising the requested data. In further examples, the command may be a request to create a new data item (e.g., generate a new customer) and the response may be an identifier (e.g., a primary key) identifying that new data item. The data may be transmitted using the JSON (JavaScript Object Notation) format.

If a command cannot be executed, the adapter 250 is further configured to transmit a response indicating that the command could not be executed. For example, if the command refers to an item of data that does not exist, an appropriate response identifying the error may be generated.

In other examples, the messages sent by the adapter 250 may be triggered by the local application 240. Particularly, an action taken by a user of the local application 240 may result in the creation or change of data that requires transmission to the cloud system 100. For example, if the local application 240 is an accountancy or payroll system, the creation of a new customer or payee by a local user requires the relevant data to be transmitted to the cloud system 100.

In one example, the adapter 250 is configured to retrieve data according to a delta change method. In other words, the adapter 250 only transmits data that has changed since the previous command or transmission. For example, if the message is a list of data items (e.g., customers), the adapter may be configured to transmit only data items that have been edited or created since the last transmission of that data to the cloud system.

In order to enable the delta change method, the adapter 250 may maintain state information, such as a historical record of the previous transmissions. In one example, the state information is stored in the storage 210.

In further examples, the adapter 250 is configurable. In other words, the adapter 250 certain parameters and configuration settings of the adapter may be manipulated, such as the configuration settings for connecting to the local data stores associated with the local application 240. In one example, the adapter 250 defines an API that allows manipulation of configuration values remotely, for example from the cloud system 100. The adapter 250 may alternatively or additionally provide a user interface that allows these settings to be manipulated by a user of the local system.

The connectivity unit 260 is configured to manage the connection between each adapter 250 and the cloud system 100. The connectivity unit 260 effectively acts as a second adapter, encapsulating the interactions between with the particular platform (e.g., the Microsoft® Office 365/Graph platform or Google® Cloud Platform) operated by cloud system 100. In one example, each connectivity unit 260 is configured to format the data extracted by the adapter 250 into a format that is suitable for upload to the storage 110 of the cloud system 100. For example, if the storage 110 comprises a spread sheet, the connectivity unit 260 formats the extracted data into worksheets or tables. In one example, the connectivity unit 260 maintains relevant authentication or authorization information for accessing the platform. In one example, the connectivity unit 260 publishes the data contract associated with the adapter 250, so that the required data format is available to cloud applications on the cloud system 100.

Each connectivity unit 260 may be configured to receive and store commands from the cloud system 100, for example by downloading the commands. Each connectivity unit 260 may also be configured to send any responses, including error messages, generated by the adapter 250 to the cloud system 100.

The synchronization engine 270 is configured to control the interactions between the cloud system 100 and the various adapters 250 and corresponding connectivity units 260. In particular, the synchronization engine 270 controls the synchronization of data between the cloud system 100 and the local system 200.

The synchronization engine 270 is operable to receive a request to initiate synchronization. The request for synchronization may be received from the cloud system 100, or the scheduler 280, which will be discussed in more detail below. The request for synchronization may comprise one or more the following parameters: a reference an adapter 250; a reference to a particular dataset within the local application 240; a reference to a particular connectivity unit 260; one or more commands. Upon receipt of the request, the synchronization engine 270 may load the specified adapters 250 with the relevant parameters and receive the results of the synchronization request from the adapters 250. The results may then be passed on to the relevant connectivity unit 260 for transmission to the cloud system 100.

In one example, the synchronization engine 270 is configured to trigger the passing of the commands stored in each connectivity unit 260 to the relevant data adapter. On execution of the commands, the synchronization engine 270 may then notify the respective connectivity units 260 of which commands were and were not successfully executed.

In further examples, the synchronization engine 270 may also be configured to filter and format the results returned by data adapter 250 before passing them to the relevant connectivity adapter 260. In one example, the synchronization engine 270 is configured to ensure the data is correctly and consistently formatted.

While it has been described above that the data adapters 250 are operable to ensure only changed data is synchronized, in certain examples this may not be possible. For example if the underlying application 240 cannot support delta changes, or if the data contract is changed so that differently formatted data must be provided to the cloud system 100, the data adapter 250 may not be able to prevent unnecessary repeated transmission of data. Furthermore, whilst certain actions performed on the local system 200 may result in changes to the data associated with the application 250, and therefore be considered a change, the changes may not actually relate to data items (e.g., fields) that are part of the data contract. In such circumstances, the data adapter 250 may consider there has been a change, but in reality, there is no change in the data to be transmitted. Accordingly, in one example, the synchronization engine 270 is configured to filter the results to ensure unchanged records are not transmitted. Particularly, the synchronization engine 270 may compare the results to stored previously transmitted results. In one example, the synchronization engine 270 may perform a brute-force comparison of the previously transmitted results and the results to be filtered, removing any results that have not changed.

It will be understood that the various components of the system 200 may pass data to/from each other in any convenient format. For example, the data may be in JSON format.

In a further example of the present application, the local system 200 comprises a scheduler 280. The scheduler 280 is configured to periodically request that the synchronization engine 270 performs the synchronization. The scheduler 280 may request the synchronization at predetermined intervals, such as a predetermined number of minutes or hours. Alternatively or additionally, the scheduler 280 may be configured to request the synchronization at fixed times of day, for example as 09:00, 12:00 and 17:00. Furthermore, the scheduler 280 may also be configured to trigger synchronization in response to an events occurring in the local application 240, such as a modification of application data. The scheduler 280 may be configured to perform this event-based synchronization a given interval (e.g., a predefined number of minutes or seconds) after the event.

In further examples, the scheduler 280 is configured to specify the particular adapters 250 or datasets to be synchronized, so that different data can be synchronized at different intervals. The parameters of the scheduler 280, such as what to synchronize, what intervals to synchronize at, and which events trigger synchronization, may be set by a user. For example, the parameters may be set locally, or via the cloud system 100.

Figure 4:
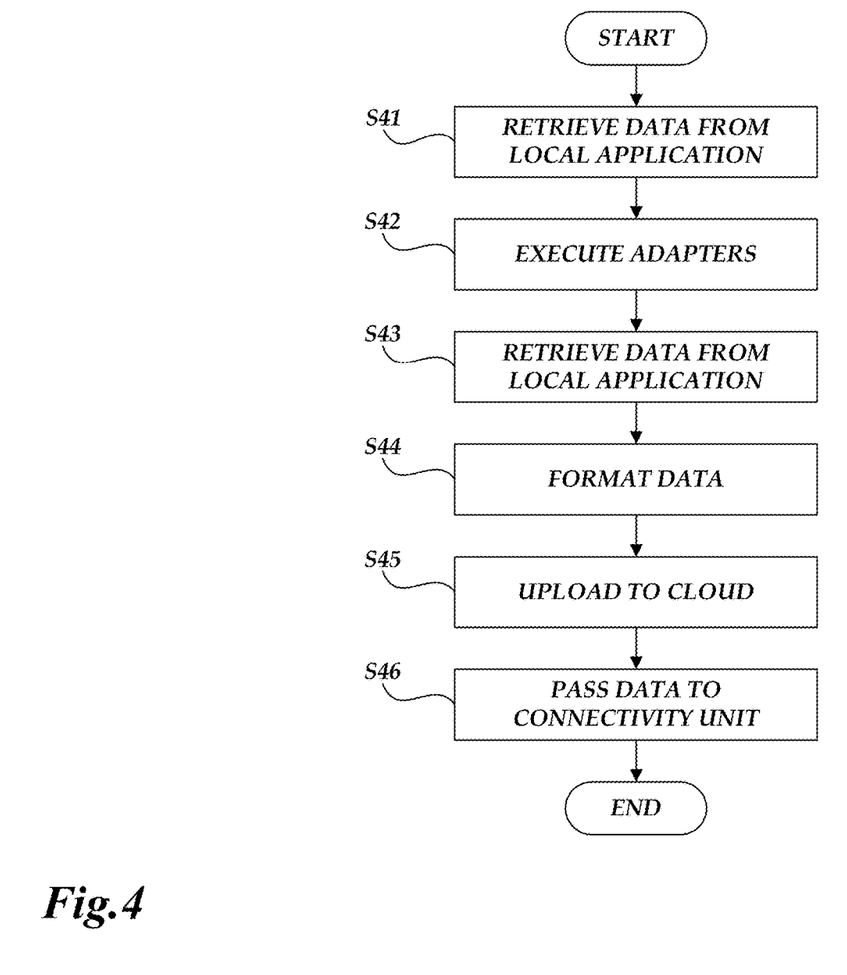
FIG. 4 is a flowchart of an example method of synchronization carried out by a local system.

A method of using the system 200 for synchronization will now be described with reference to FIG. 4. In use, the synchronization engine 270 carries out the synchronization, for example in response to a request from the scheduler 280 or the cloud system 100, as illustrated in step S41.

The synchronization engine 270 executes the adapters 250 specified by the request in step S42, and the adapters 250 in turn retrieve the data to be synchronized from their corresponding local application 240 in step S43, for example by querying databases associated with the local application 240.

The synchronization engine 270 then formats the data in step S44, and in one example, removes any data items that are unchanged since the previous synchronization.

Next, in step S45, the synchronization engine 270 passes the formatted data to the relevant connectivity unit 260. The connectivity unit 260 then uploads the data to the cloud system 100 in step S46. The connectivity unit may also format the data before uploading it.

It will be understood that the method may comprise other steps, as have been described above.

Figure 5:
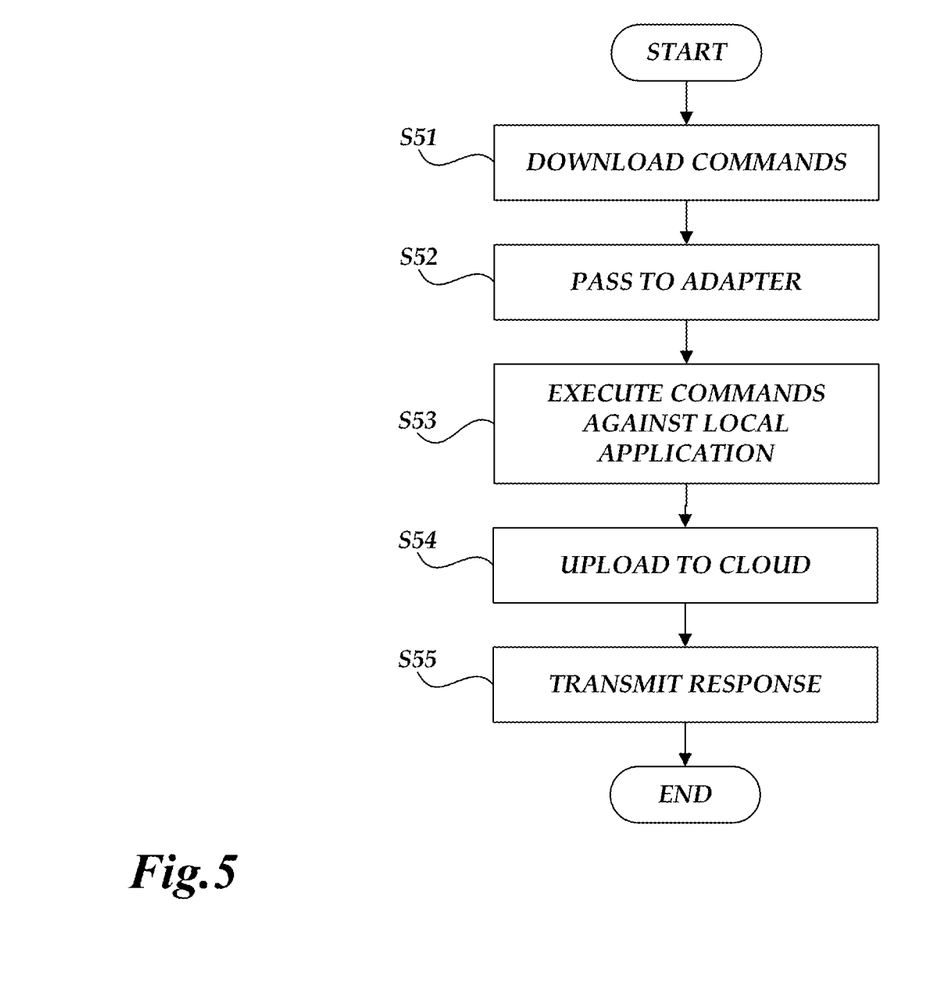
FIG. 5 is a flowchart of an example method of executing commands carried out by a local system.

Use of the system 200 for processing commands will now be described with reference to FIG. 5. In step S51, commands are received from the cloud system 100 by the connectivity unit 260.

Next, in step S52, the commands are passed to the relevant adapter 250 by the synchronization engine 280. In one example, this may be in response to a synchronization request.

Next, in step S53, the commands are executed by the adapters 250, resulting in the creation or modification of data in the corresponding local application 240.

Next, in step S54, the adapter 250 provides a response to the connectivity unit 270. In one example, the response may be an error message indicating that the command could not be executed. In a further example, the response may be a response indicating that the command has been successfully executed.

Next, the connectivity unit 270 processes the response. If the command has been successful, the command may be marked as successfully completed by the connectivity unit 270 and deleted from the stored list of commands to be processed.

Next, in step S55, the connectivity unit 270 transmits a response to cloud system 100. If the command is unsuccessful, the response may be an error message. In the event of a command being successful, the newly created data or newly edited data will be synchronized with the cloud system in the next synchronization. Alternatively, a response indicating the command has been successfully executed may be transmitted to the cloud system 100.

It will be understood that the method may comprise other steps, as have been described above.

In one example, the methods outlined above may be carried out together. In other words, the execution of the commands may be carried out as part of the synchronization, with the amended or newly created data being provided back to the cloud system 100 in the synchronization.

Figure 6:
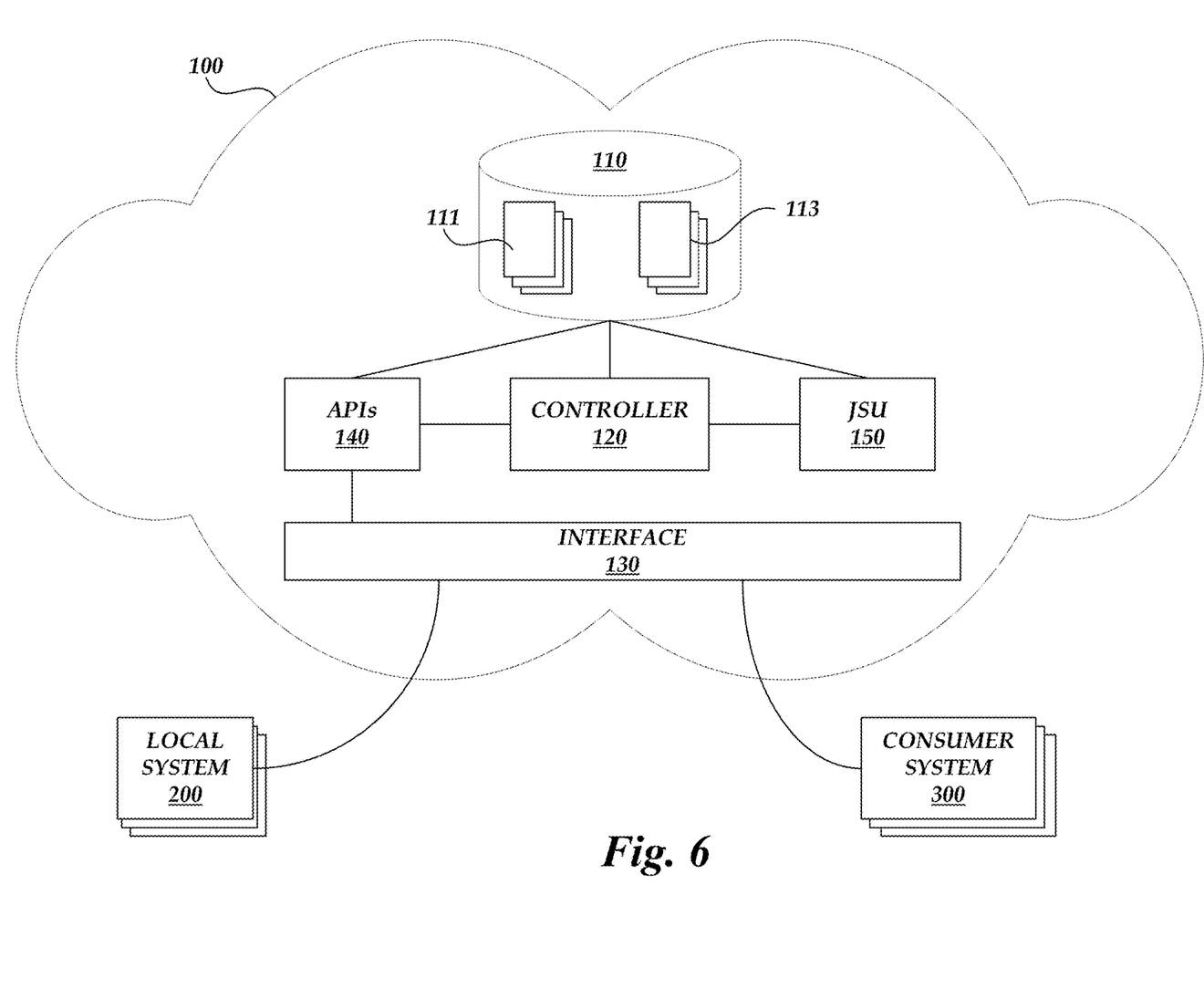
FIG. 6 is a schematic view of an example cloud system.

FIG. 6 shows an example of the cloud system 100 in more detail. The cloud system 100 comprises the storage 110, the controller 120, a network interface 130 and a plurality of APIs 140.

The communication interface 130 is a suitable network interface that manages communications to and from the local systems 200, and to and from the consumer systems 300, and may include one or more network cards, switches, routers and other such networking hardware.

The APIs 140 provide a programmatic interface that may be accessed by the local systems 200 and consumer systems 300. In one example, the APIs 140 comprise an API that allows the connectivity units 260 of the local systems 200 to access the data stored in the storage 110, so that the data stored in the local system 200 can be synchronized therewith. In one example, the APIs 140 comprise Microsoft® Graph APIs. In one example, the APIs 140 comprise APIs that allow the consumer systems 300 to access the data stored in the storage 110, so that cloud system 100 data can be accessed and modified by remote consumer systems 300.

The storage 110 includes one or more data stores 111, each of which correspond to the data held by a respective local application 240.

In one example, the data stores 111 comprise relational databases. In one example, the data stores 111 comprise flat files, such as lists of comma-separated values (CSV files), for example stored in Microsoft® One Drive or Google® Drive.

Figure 7:
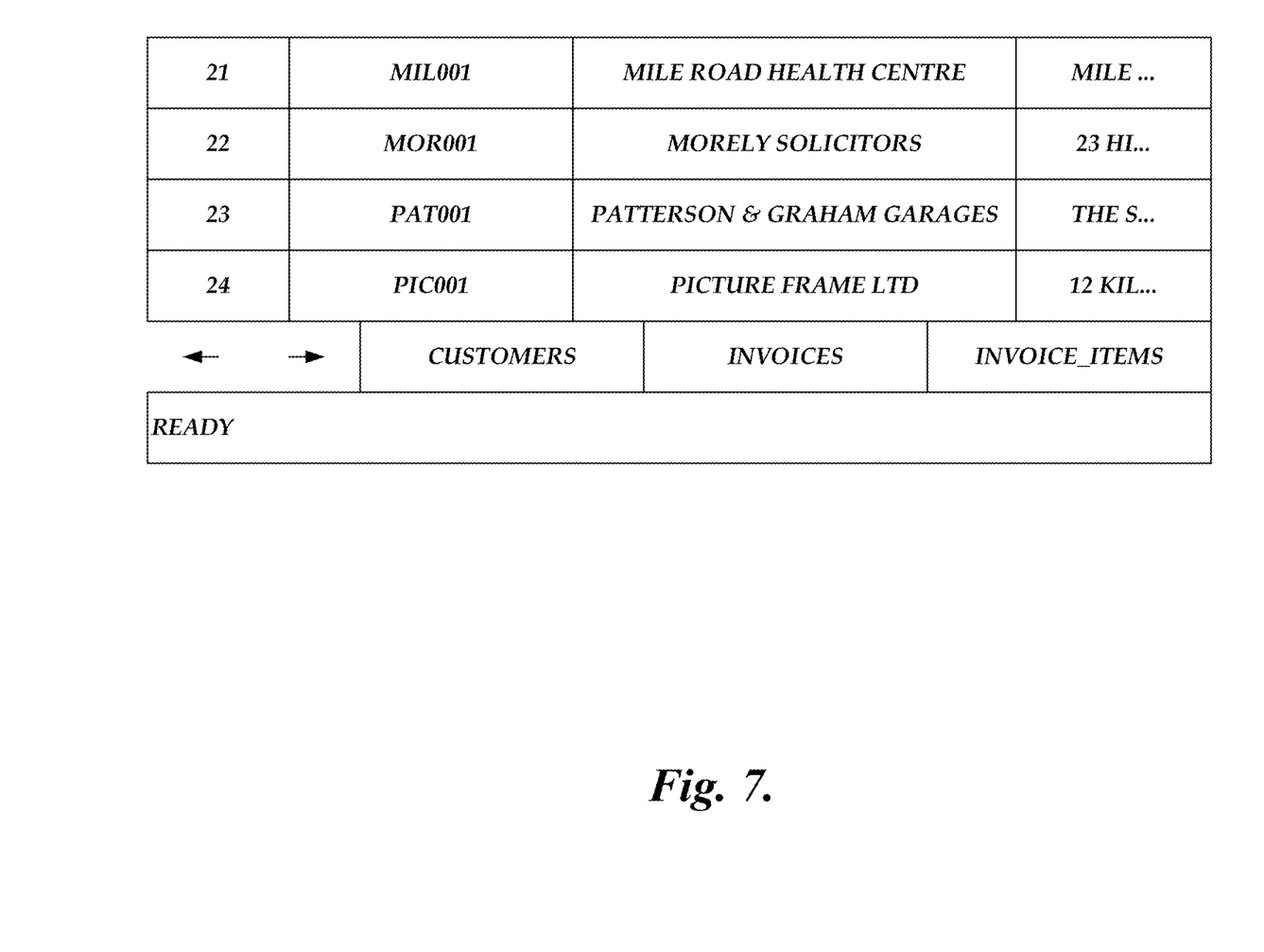
FIG. 7 is an illustration of a data store of an example cloud system.

In a further example, the data stores 111 comprise a spread sheet. Particularly, in examples where the cloud system 100 comprises the Microsoft® Graph API, Microsoft® Excel workbooks may act as the data stores. Alternatively, in examples where the cloud system 100 comprises Google® Cloud Platform, Google® Sheets may act as the data stores. Each workbook may represent a particular data set, with the worksheets of the workbook representing particular tables of the data set, as illustrated in FIG. 7. This provides a particularly advantageously lightweight, easy-to-update and easy to access data structure for storing the data synchronized from the local application 240.

In one example, the storage 110 also includes one or more command lists 113, which comprise commands to be executed by respective local applications 240. The commands present in the command lists 113 may be generated in response to actions taken by the cloud system 100 or consumer systems 300. For example, if a data store relates to payroll and a consumer system 300 requests creation of a new payee, a command may be placed in the command list 113 that instructs a local application 240 to create the new payee.

In use, a synchronization process is triggered between the cloud system 100 and one or more local applications 240 installed on one or more local systems 200. In one example, the synchronization process is triggered by the scheduler 280 of the local system 200. In other examples, the synchronization process may be triggered by the cloud system 100 sending a request to the synchronization engine 270 of the local system 200.

Upon triggering the synchronization process, the adapters 250 retrieve the data to be synchronized from the local application 240 and the data is passed to the relevant connectivity unit 260, as described above. The data to be synchronized is then sent to the cloud system 100 by the connectivity unit(s) via the relevant API. Upon receipt of the data to be synchronized, the cloud system 100 updates the data store 111 corresponding to the local application 240 to include the received data.

In a further use, the commands stored in the command lists 113 are received by the relevant connectivity units 260, for example by the connectivity units 260 downloading the command list via an API 140. In one example, the download of the command lists 113 occurs on a scheduled basis. The commands are then executed against the local application 240 as described above.

In a further example of the invention, the cloud system 100 also comprises a job service unit 150. The job service unit 150 is configured to execute one or more jobs in response to data being synchronized to the cloud system 100.

A job may involve updating data held in the storage 110 of the cloud system 100 that is not held in the data store 111. For example, the cloud system 100 may store a list of contacts for use in a cloud-based email application, which may be updated if data is synchronized editing details of a customer, supplier or other entity for which contact details may be held.

In a further example, a job may involve carrying out predefined logic to accomplish a task. For example, if the local application 240 is an accounting system, the synchronization of payment data may trigger a job that results in the generation of an invoice.

In one example, the job service unit 150 is also configured to execute jobs in response to data being modified in the cloud system 100. In one example, the jobs may result in the update of data stored on local systems 200. For example, if the list of contacts is edited to change contact details associated with an entity, the job may comprise generating commands requesting the change of details, and placing those commands in the command lists 113 for execution by the adapters 240. In one example, the job service unit 150 provides a separate API to enable the local systems 200 to access the job service unit 150.

The job service unit 150 is hosted and executed by the cloud system 100 using Microsoft® Azure or Google® App Engine.

The above-described systems and methods may advantageously allow data held on local systems under the control of locally-installed applications to be elevated into the cloud and/or accessed from the cloud. Accordingly, the data can be consumed by various systems and applications via the cloud, thereby allowing diverse remote applications to securely manipulate and view the previously inaccessible data whilst not compromising data integrity.

Furthermore, the above-described systems and methods may allow the cloud system to edit and create data in the local applications, by passing commands thereto which are then executed against the local application. The use of such commands provides a simple mechanism that avoids issues with concurrent access to the local data. The above-described systems and methods also advantageously allow other cloud-held data to be updated in response to the synchronization to the cloud.

Various adaptations of the embodiments of the invention described above are possible. In certain embodiments, the other data repositories that may be stored on the local storage 210 include data repositories on which is stored data associated with the local application 240 and against which queries from the cloud system can be executed directly.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A system for enabling cloud access to a legacy application, the system comprising:
   a local system provided by a first computer, wherein the first computer is a server computer or a desktop computer; and
   a cloud system provided by one or more second computers, wherein the one or more second computers are provided by one or more server computers;
   the local system further comprising:
      a locally installed legacy application executed by the first computer;
      a first storage comprising a first data store associated with the legacy application;
      an adapter installed on the local system and executed by the first computer to:
         retrieve data from the first data store,
         receive a command from the cloud system and then execute the command against the legacy application; and
         send a response to the cloud system, wherein the response includes retrieved data obtained from executing the command against the legacy application; and
      a synchronization engine executed by the first computer to synchronize the retrieved data with the cloud system, wherein
      the local system is configured to only synchronize data that has been changed or created since a previous synchronization;
   the cloud system further comprising:
   a second storage comprising a second data store for:
      storing one or more commands generated in response to actions performed by the cloud system; and
      storing data associated with the legacy application; and
   an application programming interface, API, providing a programmatic interface that can be accessed by the local system, configured to:
      send the one or more commands stored in the second data store to the local system; and
      receive the retrieved data from the local system and update the second data store based on the received data.

2. The system of claim 1, wherein the local system comprises a scheduler configured to request that the synchronization engine performs the synchronization.

3. The system of claim 2, wherein the cloud system comprises a job service unit configured to execute one or more jobs in response to data being synchronized to the cloud system.

4. The system of claim 3, wherein the job service unit is configured to execute jobs in response to data in the second data store being modified by the cloud system.

5. The system of claim 2, wherein the scheduler may also be configured to trigger synchronization in response to an event occurring in the legacy application.

6. The system of claim 1, wherein the second data store comprises a spread sheet.

7. The system of claim 1, wherein the cloud system includes a plurality of second data stores and is configured to synchronize data with a plurality of local systems.

8. The system of claim 1, wherein the API corresponds to a representational state transfer, REST, API.

9. The system of claim 1, further comprising one or more consumer systems that are configured to access the second data store.

10. The system of claim 1, wherein the first data store comprises a database and the adapter is configured to directly extract data by querying the database.

11. The system of claim 1, wherein the adapter is configured to retrieve only data that has been changed or created since the previous synchronization.

12. The system of claim 1, wherein the synchronization engine is configured to filter the retrieved data to remove data items that have not changed since the previous synchronization.

13. The system of claim 1, wherein the data comprises data formatted in JavaScript Object Notation, JSON.

14. The system of claim 1, wherein the local system comprises a connectivity unit configured to manage the connection between the adapter and the cloud system, wherein the connectivity unit is operable to act as a second adapter, encapsulating the interactions between with a platform used by the cloud system.

15. The system of claim 1, wherein the adapter is configured to retrieve data from a first data store associated with the locally installed legacy application for synchronization with the cloud system.

16. A method of enabling cloud access to a legacy application in a system comprising
a local system provided by a first computer, wherein the first computer is a server computer or a desktop computer, and
a cloud system provided by one or more second computers, wherein the one or more second computers are provided by one or more server computers,
wherein the local system includes:
a locally installed legacy application executed by the first computer;
a first storage comprising a first data store associated with the legacy application;
an adapter installed on the local system and executed by the first computer, to:
retrieve data from the first data store;
receive a command from the cloud system and then execute the command against the legacy application; and
send a response to the cloud system, wherein the response includes retrieved data obtained from executing the command against the legacy application; and
a synchronization engine executed by the first computer to synchronize the retrieved data with the cloud system, wherein
the local system is configured to only synchronize data that has been changed or created since a previous synchronization;
wherein the cloud system includes:
a second storage comprising a second data store for:
storing one or more commands generated in response to actions performed by the cloud system; and
storing data associated with the legacy application; and
an application programming interface, API, providing a programmatic interface that can be accessed by the local system, configured to:
send the one or more commands stored in the second data store to the local system; and
receive the retrieved data from the local system and update the second data store based on the received data;
the method comprising at the local system:
retrieving data by the adapter from the first data store;
synchronizing by the synchronization engine the retrieved data with the cloud system, and at the cloud system:
receiving the retrieved data by the API, and updating the second store based on the received data.

17. The method of claim 16, wherein the method is carried out in response to a request from a scheduler or the cloud system.

18. The method of claim 16, comprising removing any data items from the received data that are unchanged since the previous synchronization.

* * * * *